(12) United States Patent
Rucklidge

(10) Patent No.: US 6,249,603 B1
(45) Date of Patent: Jun. 19, 2001

(54) EFFICIENT SEARCH FOR A GRAY-LEVEL PATTERN IN AN IMAGE

(75) Inventor: William J. Rucklidge, Mountain View, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/098,278

(22) Filed: Jun. 16, 1998

(51) Int. Cl.$^7$ .................................................... G06K 9/00
(52) U.S. Cl. ............................................ 382/169; 345/147
(58) Field of Search ................................... 382/169, 170, 382/172, 232, 276, 277, 302, 171; 345/147; 358/455

(56) References Cited

U.S. PATENT DOCUMENTS

| 5,410,617 | * | 4/1995 | Kidd et al. ............................. 382/51 |
| 5,694,224 | * | 12/1997 | Tai ........................................ 358/455 |
| 5,745,173 | * | 4/1998 | Edwards et al. ..................... 348/208 |
| 6,026,179 | * | 2/2000 | Brett .................................... 382/162 |

OTHER PUBLICATIONS

W. Rucklidge, *Efficient Visual Recognition Using the Hausdorff Distance, Lecture Notes in Computer Science*, 1996.

P. Anandan, A Computational Framework and an Algorithm for the Measurement of Visual Motion, International Journal of Computer Vision 2, 1989, pp. 283–310.

Michael J. Black, *Combining Intensity and Motion for Incremental Segmentation and Tracking Over Long Image Sequences*, Computer Vision–ECCV 92, Second European Conference on Computer Vision, May 19–22, 1992, pp. 485–493.

Mei–Juan Chen, Liang–Gee Chen and Tzi–Dar Chiueh, *One–Dimensional Full Search Motion Estimation Algorithm For Video Coding*, IEEE Transactions on Circuits and Systems for Video Technology, vol. 4, No. 5, Oct. 1994, pp. 504–509.

Mei–Juan Chen, Liang–Gee Chen Tzi–Dar Chiueh and Yung–Pin Lee, *A New Block–Matching Criterion for Motion Estimation and its Implementation*, IEEE Transactions on Circuits and Systems for Video Technology, vol. 5, No. 3, Jun. 1995, pp. 231–236.

H. Gharavi and Mike Mills, *Blockmatching Motion Estimation Algorithms—New Results*, IEEE Transactions on Circuits and Systems, vol. 37, No. 5, May 1990, pp. 649–651.

Daniel P. Huttenlocher, Gregory A. Klanderman and William J. Rucklidge, *Comparing Images Using the Hausdorff Distance*, IEEE Transactions on Pattern Analysis and Machine Intelligence, vol. 15, No. 9, Sep. 1993, pp. 850–863.

(List continued on next page.)

*Primary Examiner*—Joseph Mancuso
*Assistant Examiner*—Yosef Kassa
(74) *Attorney, Agent, or Firm*—Fliesler, Dubb, Meyer & Lovejoy LLP

(57) ABSTRACT

The present invention is directed to a system for finding a transformation of a gray-level pattern in an image. The system recursively searches a transformation space in a multi-resolution manner. At each resolution, the transformation space is divided into groups of transformations. For each group, pixels in the pattern are compared to neighborhoods of pixels in the image in order to identify whether a specific pattern pixel is within the minimum and maximum values of a neighborhood of pixels.

29 Claims, 9 Drawing Sheets

OTHER PUBLICATIONS

Daniel P. Huttenlocher, Jae J. Noh and William J. Rucklidge, *Tracking Non–Rigid Objects in Complex Scenes*, Fourth International Conference on Computer Vision, sponsored by IEEE Computer Society Technical Committee on Pattern Analysis and Machine Intelligence, Berlin, Germany, May 11–14, 1993, pp. 93–101.

Bruce D. Lucas and Takeo Kanade, *An Iterative Image Registration Technique with an Application to Stereo Vision*, Seventh International Joint Conference on Artificial Intelligence, sponsored by International Joint Conferences on Artificial Intelligence Canadian Society for Computational Studies of Intelligence American Association for Artificial Intelligence, Vancouver, Canada, Aug. 24–28, 1981, pp. 674–679.

Ram Srinivasan and K. R. Rao, *Predictive Coding Based on Efficient Motion Estimation*, IEEE Transactions on Communications, vol. Com–33, No. 8, Aug. 1985, pp. 888–896.

Chang–Hsing lee and Ling–Hwei Chen, *A Fast Motion Algorithm Based on the Block Sum Pyramid*, IEEE Transactions on Image Processing, Voll. 6, No. 11, Nov. 1997, pp. 1587–1591.

W. Li and E. Salari, *Successive Elimination Algorithm for Motion Estimation*, IEEE Transactions on Image Processing, vol. 4, No. 1, Jan. 1995, pp. 105–110.

William Rucklidge, *Efficiently Locating Objects Using the Hausdorff Distance*, International Journal of Computer Vision 24(3), 251–270 (1997).

* cited by examiner

| 255 | 255 | 0 | 0 |
|---|---|---|---|
| 255 | 255 | 0 | 0 |
| 255 | 255 | 0 | 0 |
| 255 | 255 | 0 | 0 |

Pattern

*FIG. 7*

| 255 | 0 | 255 | 0 | 255 | 0 | 255 | 0 |
|---|---|---|---|---|---|---|---|
| 255 | 0 | 255 | 0 | 255 | 0 | 255 | 0 |
| 255 | 0 | 255 | 0 | 255 | 0 | 255 | 0 |
| 255 | 0 | 255 | 0 | 255 | 0 | 255 | 0 |
| 255 | 0 | 255 | 0 | 255 | 0 | 255 | 0 |
| 255 | 0 | 255 | 0 | 255 | 0 | 255 | 0 |
| 255 | 0 | 255 | 0 | 255 | 0 | 255 | 0 |
| 255 | 0 | 255 | 0 | 255 | 0 | 255 | 0 |

Image

*FIG. 8*

| 1020 | 510 | 0 |
|---|---|---|
| 1020 | 510 | 0 |
| 1020 | 510 | 0 |

| 2040 |
|---|

| 510 | 510 | 510 | 510 | 510 | 510 | 510 |
|---|---|---|---|---|---|---|
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |

| 2040 | 2040 | 2040 | 2040 | 2040 |
|---|---|---|---|---|
| 2040 | 2040 | 2040 | 2040 | 2040 |
| 2040 | 2040 | 2040 | 2040 | 2040 |
| 2040 | 2040 | 2040 | 2040 | 2040 |
| 2040 | 2040 | 2040 | 2040 | 2040 |

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

| 2040 | 2040 | 2040 | 2040 | 2040 |
|---|---|---|---|---|
| 2040 | 2040 | 2040 | 2040 | 2040 |
| 2040 | 2040 | 2040 | 2040 | 2040 |
| 2040 | 2040 | 2040 | 2040 | 2040 |
| 2040 | 2040 | 2040 | 2040 | 2040 |

| 510 | 510 | 510 | 510 | 510 | 510 | 510 |
|---|---|---|---|---|---|---|
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |

| 255 | 255 | 255 | 255 | 255 | 255 | 255 |
|-----|-----|-----|-----|-----|-----|-----|
| 255 | 255 | 255 | 255 | 255 | 255 | 255 |
| 255 | 255 | 255 | 255 | 255 | 255 | 255 |
| 255 | 255 | 255 | 255 | 255 | 255 | 255 |
| 255 | 255 | 255 | 255 | 255 | 255 | 255 |
| 255 | 255 | 255 | 255 | 255 | 255 | 255 |
| 255 | 255 | 255 | 255 | 255 | 255 | 255 |

| 510 | 510 | 510 | 510 | 510 | 510 | 510 |
|-----|-----|-----|-----|-----|-----|-----|
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |
| 510 | 510 | 510 | 510 | 510 | 510 | 510 |

| 2040 | 2040 | 2040 | 2040 | 2040 |
|------|------|------|------|------|
| 2040 | 2040 | 2040 | 2040 | 2040 |
| 2040 | 2040 | 2040 | 2040 | 2040 |
| 2040 | 2040 | 2040 | 2040 | 2040 |
| 2040 | 2040 | 2040 | 2040 | 2040 |

EFFICIENT SEARCH FOR A GRAY-LEVEL PATTERN IN AN IMAGE

CROSS-REFERENCE TO RELATED APPLICATIONS

This Application is related to the following Application:

Efficient Search for a Gray-level Pattern In An Image Using Ranges of Sums, by William J. Rucklidge, Ser. No. 09/097,724, filed the same day as the present application.

This related Application is incorporated herein by reference.

BACKGROUND OF THE INVENTION

1. Field of the Invention

The present invention is directed to a system for finding a gray-level pattern in an image.

2. Description of the Related Art

There has been a significant amount of work on the problem of locating the best transformation of a gray-level pattern in an image. A transformation, in a broad sense, is a movement of a pattern or image. For example, while recording a sequence of video images, an object may move causing its position in the recorded images to change as the video sequence progresses. One transformation of interest is a translation, which is defined as movement in two dimensions (e.g. x and y directions) without rotation. A more complicated transformation is the affine transformation, which includes translation, rotation, scaling and/or shear. With affine transformations, parallel lines in the pattern remain parallel even after being transformed.

The ability to locate the best transformation of a gray-level pattern in an image forms the basis of one of the components of MPEG encoding. It is also part of computer vision systems that are used to navigate robots, find parts automatically in an inventory or manufacturing facility, register images, track objects, etc.

One method for searching for the correct transformation of a pattern in an image is to determine every possible transformation, and to compare the pattern to the image at every transformation. The transformation with the lowest error is the actual transformation of the image. Because this method tests every transformation, it is slow and requires a lot of computer resources. Previous work to improve on the above-described method has concentrated on search methods that are less expensive, but may not find the best transformation.

For example, the computer vision community have experimented with methods that utilize the sum-of-squared-differences to compute intensity image patches; however, such work has concentrated on search methods that are not guaranteed to find the best corresponding patches. For example, pyramid-based systems work with multi-resolution representations of the image and the pattern, and match first at the coarsest resolution, then the next finer resolution in a smaller region around the coarser match, then the next finer resolution and so on. A mistake at the coarsest resolution can easily cause a large error in the final result.

Motion compensation for video compression has also been the focus of much investigation. The emphasis has been searching for a translation in an efficient manner, but not evaluating every translation. Again, the methods have not been guaranteed. That is, the previous work does not guarantee finding the best translation. Experimentation reveals that the previous work will not be accurate enough to correctly find the pattern in a new image.

The prior art attempts to improve on the traditional methods for finding a pattern in an image by reducing compute time at the expense of sacrificing accuracy. Therefore, a system is needed that can find a transformation of a gray-level pattern in an image that is faster than trying every transformation but more accurate than the prior art.

SUMMARY OF THE INVENTION

The present invention, roughly described, provides for a system for determining a transformation of a gray-level pattern in an image. In one embodiment, the pattern is identified in a first image. The system then receives a second image and finds a transformation of the pattern in the second image. When finding transformations in a video sequence, the system can update the pattern based on the newly found pattern in a newly received image, thus taking into account any changes in environment (e.g. light, brightness, rotation, change in shape, etc.).

Finding a transformation includes dividing a set of transformations into groups of transformations, each group having a reference transformation, and determining whether a set of pixel intensities of the pattern are within minimum values and maximum values. The minimum values represent minimum pixel intensities for neighborhoods of pixels in the image and the maximum values represent maximum pixel intensities for neighborhoods of pixels in the image. The step of determining is performed for each reference transformation from the first set. A difference function is applied based on the step of determining whether a set of pixel intensities are within the minimum and maximum values. A reference transformation which meets a predefined set of criteria with respect to the difference function is identified. In one embodiment, the predefined criteria is the reference transformation having the lowest difference value.

In one embodiment, the system continuously divides a transformation space for the image into smaller groups until a minimum group size is considered. Each of the groups belong to a resolution level. The step of dividing includes choosing at least one group for dividing in at least a subset of the levels. The step of choosing also includes determining a difference value for a subset of groups based on whether a set of pixel intensities for the pattern are within minimum values and maximum values. The system then backtracks through the levels and removes groups from consideration having a difference value worst than a best known difference value and performing the step of continuously dividing on any group having a difference value better than the best known value. Subsequent to completing the step of backtracking, the best known difference value corresponds to the best known transformation of the gray-level pattern in the image.

The present invention can be implemented using hardware, software or a combination of hardware and software. If the invention is implemented with hardware, a general purpose computer, a specifically designed computer or a specifically designed circuit can be used. If the invention is implemented with software, the software can be stored on any appropriate storage medium including RAM, ROM, CD-ROM, floppy disks, hard disks, non-volatile memory and other memory devices.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 7 is an example pattern.

FIG. 8 is an example image.

FIGS. 9A and 9B are example pattern arrays.

FIGS. 10A and 10B are example image arrays.

FIGS. 11A–11C are example minimum arrays.

FIGS. 12A–12C are example maximum arrays.

DETAILED DESCRIPTION

Figure 1:
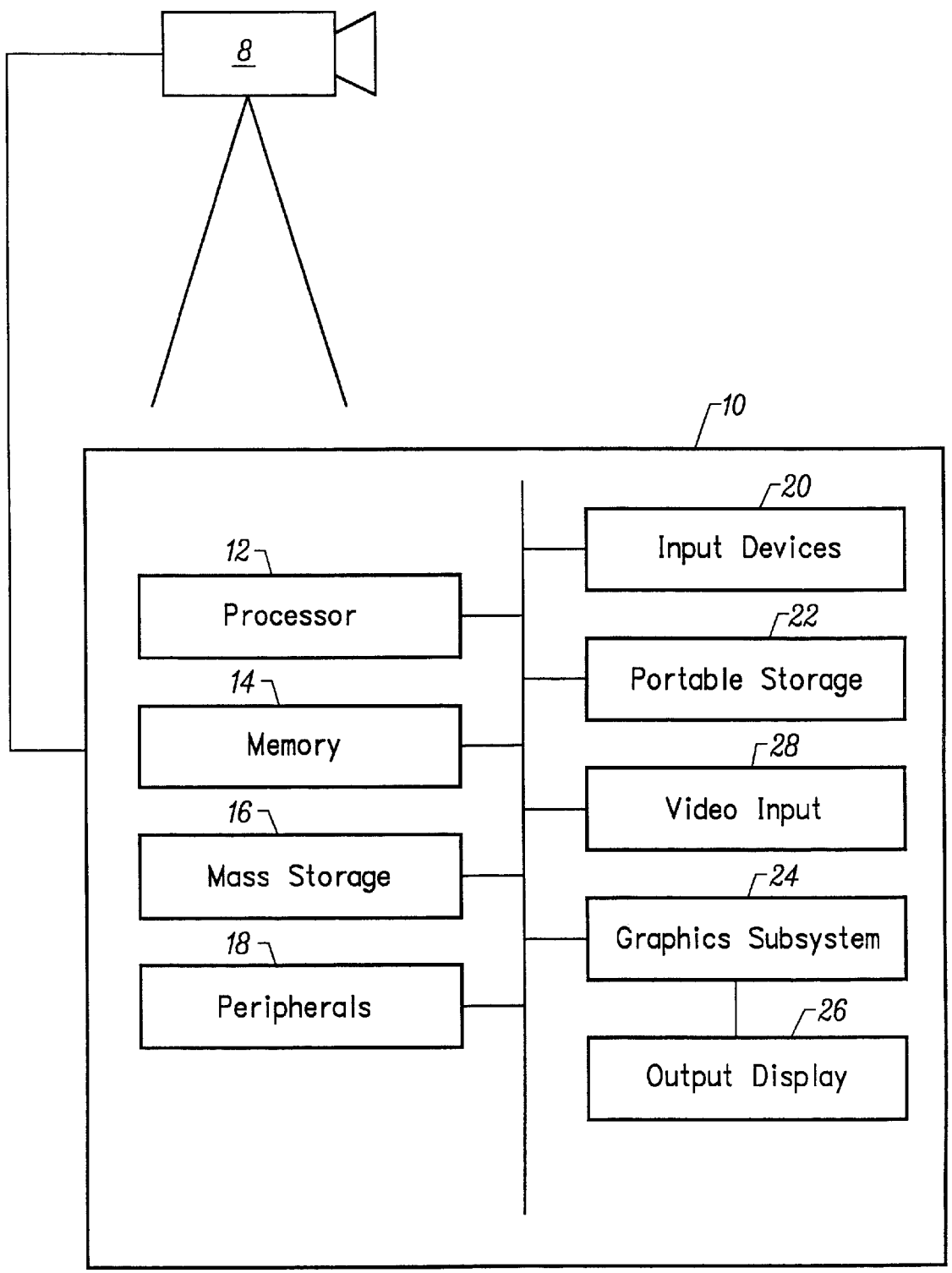
FIG. 1 is a block diagram of one exemplar hardware architecture that can be used to practice the present invention.

FIG. 1 is a high level block diagram of one exemplar hardware architecture that can be used to practice the present invention. In one embodiment, the present invention can include video camera 8 and a general purpose computer 10. Video camera 8 can be any video camera known in the art that can capture sufficiently good quality images for transmission to a computer system. One example of a video camera is a camera that captures interlaced video at 30 frames per second in NTSC format. The video signal from camera 8 is sent to computer 10. In one embodiment, computer 10 is a general purpose computer. In another embodiment, computer 10 can be a special purpose computer adapted for use with video applications.

In one embodiment, computer 10 contains a processor unit 12 and main memory 14. Processor unit 12 may contain a single microprocessor or may contain a plurality of microprocessors for configuring computer system 10 as a multi-processor system. Main memory 14 stores, in part, instructions and data for execution by processor unit 12. If the system for finding a transformation of a pattern is wholly or partially implemented in software, main memory 14 stores the executable code when in operation. Main memory 14 may include banks of dynamic random access memory (DRAM) as well as high speed cache memory.

Computer system 10 further includes a mass storage device 16, peripheral device(s) 18, input device(s) 20, portable storage medium drive(s) 22, a graphics subsystem 24 and an output display 26. For purposes of simplicity, the components in computer system 10 are shown in FIG. 1 as being connected via a single bus. However, computer system 10 may be connected through one or more data transport means. For example, processor unit 12 and main memory 14 may be connected via a local microprocessor bus, and the mass storage device 16, peripheral device(s) 18, portable storage medium drive(s) 22, graphics subsystem 24 may be connected via one or more input/output (I/O) buses. Mass storage device 16, which may be implemented with a magnetic disk drive or an optical disk drive, is a non-volatile storage device for storing data and instructions for use by processor unit 12. In one embodiment, mass storage device 16 stores the system software for determining a transformation of an image for purposes of loading to main memory 14.

Portable storage medium drive 22 operates in conjunction with a portable non-volatile storage medium, such as a floppy disk, to input and output data and code to and from computer system 10. In one embodiment, the system software for determining a transformation is stored on such a portable medium, and is input to the computer system 10 via the portable storage medium drive 22. Peripheral device(s) 18 may include any type of computer support device, such as an input/output (I/O) interface, to add additional functionality to the computer system 10. For example, peripheral device(s) 18 may include a network interface card for interfacing computer system 10 to a network, a modem, etc.

Input device(s) 20 provide a portion of the user interface for computer system 10. Input device(s) 20 may include an alpha-numeric keypad for inputting alpha-numeric and other information, or a cursor control device, such as a mouse, a trackball, stylus, or cursor direction keys. In order to display textual and graphical information, computer system 10 contains graphics subsystem 24 and the output display 26. Output display 26 includes any suitable monitor display device. Graphics subsystem 24 receives textual and graphical information, and processes the information for output display 26. Output display 26 can be used to report the results of the method for finding a transformation. Computer 10 also includes a video input device 28. In one embodiment, video input device 28 can include any one or a combination of the following: a video input card, analog to digital converter, video interface port, or other hardware to interface between a video camera and a computer. The signal from camera 8 is sent to video input device 28 for use by computer 10.

The components contained in computer system 10 are those typically found in general purpose computer systems, and are intended to represent a broad category of such computer components that are well known in the art. The system of FIG. 1 illustrates one platform which can be used for the present invention. Numerous other platforms can also suffice, such as platforms with different bus configurations, networked platforms, multi-processor platforms, other personal computers, workstations, mainframes, and so on.

Figure 2:
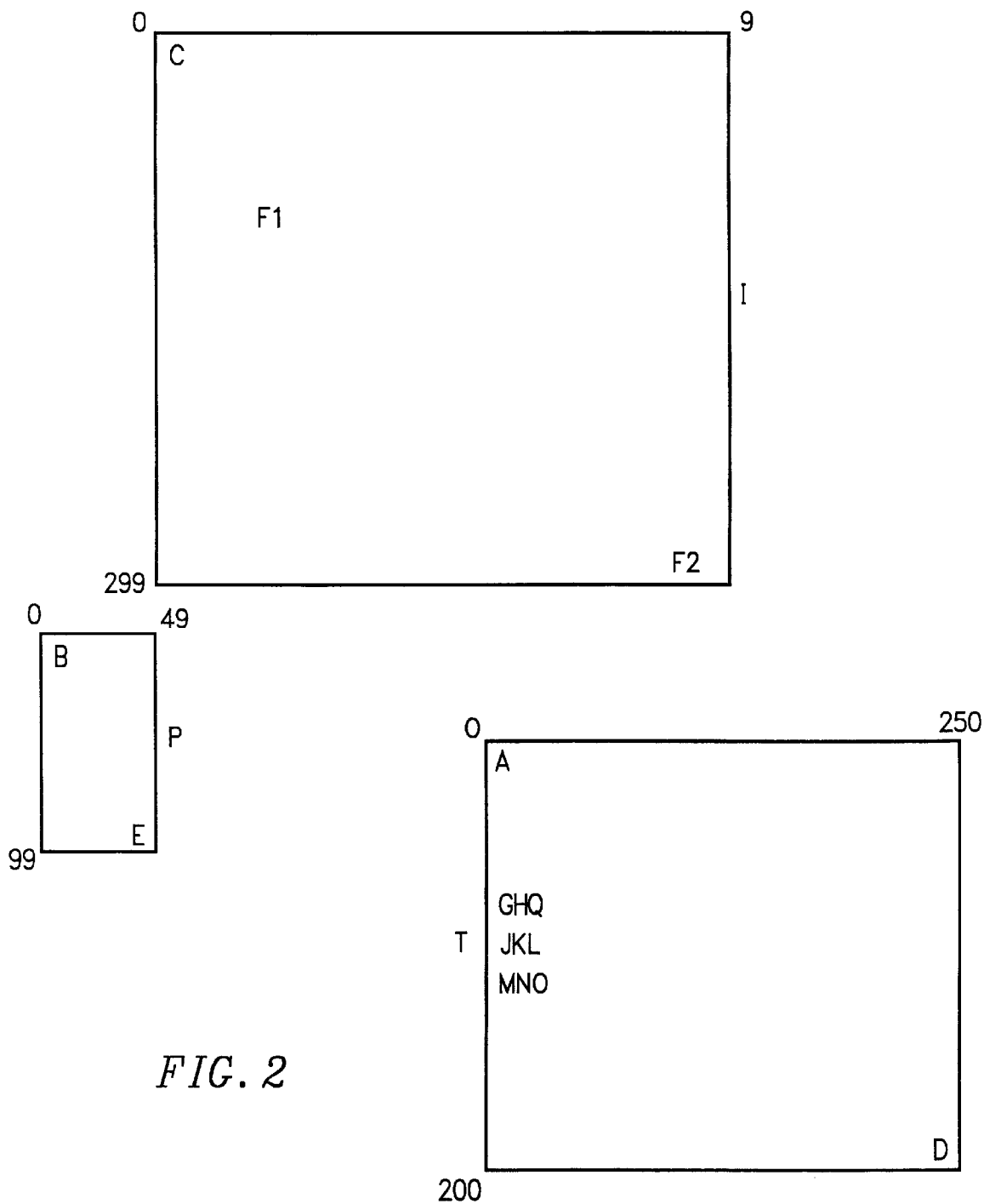
FIG. 2 shows a pattern P, an image I and a representation of transformation space T.

The present invention is directed to a system for finding a transformation of a gray-level pattern in an image. Given a gray-level image I that is $I_w \times I_h$ pixels and a pattern P that is $P_w \times P_h$ pixels, the system looks to find the subregion of I that best matches P. For example, FIG. 2 shows a pattern P and an image I. Although FIG. 2 shows pattern P and image I to be rectangular, a rectangular shape is not necessary. For exemplar purposes, assume that image I is a rectangular image at 300×300 pixels. Each pixel is identified by a set of x and y coordinates. The pixel at location C in image I is at the origin and has the coordinates (0, 0). The pixel at location F2 has the coordinates (299, 299). Assume for exemplar purposes that pattern P is a rectangular pattern with 50×100 pixels. Pattern P can be placed inside image I. Assume that the transformation is such that the entire pattern P fits within image I. Box T represents the transformation space of all possible transformations of P into I. For a translation, each potential transformation is represented by a set of coordinates (x, y) such that the x-coordinate represents the amount of x direction transformation and the y-coordinate represents the amount of the y direction transformation. Thus, the location A in transformation T has the coordinates (0, 0) and represents a translation with no movement in the x or y directions. That is, if pixel B in pattern P was at location C in a first image, then after being transformed by transformation A, pixel B would still be at location C. There are 251 possible x translations and 201 possible y translations. Point D in translation T represents a translation of (250, 200). Translation D could correspond to pixel E of pattern 60 being translated from point F1 (49, 99)

to F2 (299, 299) in image I. The discussion above in regard to transforming pattern P describes two dimensional transformations. However, the present invention also applies to other transformations including affine transformations.

The problem of finding the transformation of P in I is best understood by thinking of two tasks: the block difference function and the search technique. The block difference function is a function that takes the pattern P and a candidate transformation of P and returns some measure of the difference between the transformed P and the corresponding region of I. The search technique is the manner in which candidate transformations are searched to find the best-matching transformation.

First, it is useful to discuss a number of block difference functions, and some generalizations and modifications to increase their tolerance of various forms of error. A block difference function takes an array of pixel intensity values P[x, y] (defined for $0 \leq x \leq P_w$ and $0 \leq y \leq P_h$), an image array I[x, y] (defined for $0 \leq x \leq I_w$ and $0 \leq y \leq I_h$) and a translation ($t_x$, $t_y$), and computes some measure of the difference between the array P and the sub-array of I corresponding to the transformation. The most commonly-used measure is the sum of squared differences:

$$D^{ssd}(t_x, t_y) = \sum_{x=0}^{P_w-1} \sum_{y=0}^{P_h-1} (P[x, y] - I[t_x + x, t_y + y])^2$$

The sum of absolute differences D sad and the maximum of absolute differences $D^{mad}$ have also been used.

$$D^{sad}(t_x, t_y) = \sum_{x=0}^{P_w-1} \sum_{y=0}^{P_h-1} |P[x, y] - I[t_x + x, t_y + y]|$$

$$D^{mad}(t_x, t_y) = \max_{x=0}^{P_w-1} \max_{y=0}^{P_h-1} |P[x, y] - I[t_x + x, t_y + y]|$$

Another difference function that has been proposed is the pixel difference classification measure. This measure relies on an additional threshold τ (e.g. 20), and classifies two pixels as the same if their absolute difference is no larger than τ, it then counts mismatched pixels. Let $$t_\tau(v) = \begin{cases} 0 & \text{if } v \leq \tau \\ 1 & \text{if } v > \tau \end{cases}$$

be a threshold function based on τ. The difference function is now $$D^{pdc}(t_x, t_y) = \sum_{x=0}^{P_w-1} \sum_{y=0}^{P_h-1} t_\tau(|P[x, y] - I[t_x + x, t_y + y]|)$$

An additional rank block difference function can be derived by letting θ be a value between 0 and 1 (e.g. 0.75) and defining $$D^{rank}(t_x, t_y) = f^{th}_{\substack{0 \leq x < P_w \\ 0 \leq y < P_h}} |P[x, y] - I[t_x + x, t_y + y]|$$

where $f_{a \in A}^{th} g(a)$ denotes the f-th quantile value of g(a) over the set A, for some value of $f$ between zero and one. For example, the 1-th quantile value is the maximum and the ½-th quantile value is the median.

$D^{rank}$ is derived by analogy with the partial Hausdorf distance, which is explained in "Comparing Images Using The Hausdorf Distance," Huttenlocher, Kanderman and Ruckiidge, IEEE Transactions on Circuits and Systems, 37(5):649–651, May 1990, incorporated by reference. $D^{rank}$ is also a generalization of $D^{mad}$: If $f=1$, then the two functions ($D^{rank}$ and $D^{mad}$) are the same, since both report the maximum absolute pixel difference. $D^{mad}$ is too unstable for practical use, as a single corrupted pixel value causes it to be large, even if all the other pixel values match well. Setting $f$ to some value lower than 1 allows some of the pixels to be treated as outliers.

All of the block functions discussed above are based on the pixel difference function $\delta(x_P, y_P, x_I, y_I) = |P[x_P, y_P] - I[x_I, y_I]|$, the absolute difference between a pixel of the transformed pattern P and the corresponding pixel of the image I. The pixel difference function can be replaced with a function based on comparing the pattern pixel to a range of values in a region (or neighborhood) of the image, and report the difference between the pattern pixel's value and that range.

Let N(x, y) represent some neighborhood of the location (x, y) in I. Define the maximum pixel intensity of the neighborhood $M_N[x, y]$ and the minimum pixel intensity of the neighborhood $M_N[x, y]$ as:

$$M_N[x, y] = \max_{(x', y') \in N(x,y)} I[x', y']$$

$$m_N[x, y] = \min_{(x', y') \in N(x,y)} I[x', y']$$

and $$\delta_N(x_P, y_P, x_I, y_I) = \begin{cases} P[x_P, y_P] - M_N[x_I, y_I] & \text{if } P[x_P, y_P] \geq M_N[x_I, y_I]; \\ m_N[x_I, y_I] - P[x_P, y_P] & \text{if } m_N[x_I, y_I] \geq P[x_P, y_P]; \\ 0 & \text{otherwise} \end{cases}$$

Thus, $\delta_N(x_P, y_P, x_I, y_I)$—the pixel/region difference function—encodes the difference between the pixel $P[x_P, y_P]$ and the region $N(x_I, y_I)$. If the value $P[x_P, y_P]$ is inside the range of maximum and minimum values in $N(x_I, y_I)$, then the difference is zero; if it is outside this range, then it is the difference between $P[x_P, y_P]$ and the nearest endpoint of the range. If the neighborhood N(x, y) consists just of the single point (x,y), then $\delta_N(x_P, y_P, x_I, y_I) = \delta(x_P, y_P, x_I, y_I)$. Thus, $\delta_N$ is a generalization of the absolute pixel difference function used in the block difference functions, and can be substituted in any of the block difference functions.

The block difference functions using $\delta_N$ are not as sensitive to slight non-translational components of the transformation of the pattern. For example, suppose that P represents an object to be located in I. It is unlikely that I contains an exact copy of P. Let P' be the patch of I that actually corresponds to the object. The standard block difference functions are primarily designed for the situation where P' is just P corrupted by some pixel-based noise process. Each pixel of P and the corresponding pixel of P' are the same point on the object, but their values are different due to lighting changes, sensor noise, and so on. However, if the object appears in P' slightly larger than it does in P, these difference functions have problems since there is no simple translational correspondence between the pixels of P and P. Adding a neighborhood to the pixel difference function counteracts this problem somewhat because each pixel in P is compared against a neighborhood in I (and thus P'), and (at the correct translation) this neighborhood is more likely to contain the pixel of P' corresponding to the point of the object that generated this pixel of P. If the neighborhood used is too large, however, it produces a block difference function with no discriminating power.

The block difference function $D^{ssd}$ can be extended to incorporate $\delta_N$ as follows:

$$D_N^{ssd}(t_x, t_y) = \sum_{x=0}^{P_w-1} \sum_{y=0}^{P_h-1} (\delta_N(x, y, x+t_x, y+t_y))^2$$

Any of the other block difference functions can similarly be extended to incorporate $\delta_N$. Another possible modification involves replacing the absolute difference of pixel intensities $\delta(x_P, y_P, x_I, y_I)$ with any monotonic function of the absolute difference.

Searching for the best translation of the pattern is appropriate in a number of application domains, when the object represented by the pattern is moving parallel to the image plane, or when the frame-to-frame change in the pattern's appearance is small. However, in many applications a more general transformation of the pattern better fits the change in appearance of the target object. An affine transformation can capture translation, rotation, scale change, and/or foreshortening. An affine transformation can be considered as a 2×2 matrix A together with a translation $(t_x, t_y)$, representing a mapping of:

$$(x, y) \rightarrow (a_{00}x+a_{01}y+t_x, a_{10}x+a_{11}y+t_y)$$

where A is the matrix $$A = \begin{bmatrix} a_{00} & a_{01} \\ a_{10} & a_{11} \end{bmatrix}$$

The affine transformation can also be represented as a six-tuple $(a_{00}, a_{01}, a_{10}, a_{11}, t_x, t_y)$.

The block difference functions described above are based on the pixel difference function $\delta(x_P, y_P, x_I, y_I) = |P[x_P, y_P] - I[x_I, y_I]|$. The pixel difference for pixel $(x_P, y_P)$ of the pattern, when the pattern is being transformed by the affine transformation $(A, t_x, t_y)$, is $$\delta(x_P, y_P, <a_{00}x_P + a_{01}y_P + t_x>, <a_{10}x_P + a_{11}y_P + t_y>)$$

where <·> represents rounding a value to the nearest integer. Thus, each pattern pixel is compared to the image pixel closest to its transformed location. Similar to the discussion above, $\delta_N$ can be substituted for $\delta$ for affine transformations. Each pattern pixel is compared to the range of values in the neighborhood surrounding the image pixel closest to that pattern pixel's transformed coordinates.

For convenience, let:

$$d(A, t_x, t_y, x_P, y_P) = \delta(x_P, y_P, <a_{00}x_P + a_{01}y_P + t_x>, <a_{10}x_P + a_{11}y_P + t_y>), \text{ and}$$

$$d_N(A, t_x, t_y, x_P, y_P) = \delta_N(x_P, y_P, <a_{00}x_P + a_{01}y_P + t_x>, <a_{10}x_P + a_{11}y_P + t_y>)$$

Then, the block difference function for the sum of squared differences for affine transformations can be written as:

$$D^{ssd}(A, t_x, t_y) = \sum_{x=0}^{P_w-1} \sum_{y=0}^{P_h-1} (d_N(A, t_x, t_y, x, y))^2$$

the block difference functions $D^{pdc}$ and $D^{rank}$ can similarly be rewritten for affine transformations.

The difference functions involve comparing the transformed pattern pixel to the nearest image pixel or region. Other systems have compared the transformed pattern pixel, without rounding, to an interpolated version of the image, typically by performing a bilinear interpolation of the four image pixels closest to the pattern pixel's transformed location. This is more computationally expensive, but reduces the effects of artifacts due to rounding. The above equations could be redefined without rounding, in terms of an interpolated image. However, if the pixel/region difference function $\delta_N$ is being used, there is less difference between the interpolated and rounded functions, at least for the common case of bilinear interpolation. If a pattern pixel is compared to the neighborhood consisting of the four image pixels surrounding its transformed position, then it is being compared to the four pixels from which the interpolated image value would have been drawn.

The pattern P could be located in image I by trying every possible transformation, evaluating the appropriate block difference function for each transformation, and reporting the transformation where the best result was found. Performing each block difference function evaluation is an expensive operation; therefore, the overall search using this strategy is unlikely to have acceptable performance. To increase performance, the present invention proposes a search method that will find the transformation minimizing the block difference function, but does not need to evaluate every transformation. Instead, it performs some pre-computation that allows it to rule out a large number of transformations at once.

Let w and h be any positive integers. Define $$M_{wh}[x, y] = \max_{\substack{0 \le x' < w \\ 0 \le y' < h}} I[x+x', y+y'] \quad (A)$$

$$m_{wh}[x, y] = \min_{\substack{0 \le x' < w \\ 0 \le y' < h}} I[x+x', y+y'] \quad (B)$$

where the values of $I[x, y]$ lying outside its actual bounds should be considered to be $-\infty$ for $M_{wh}$ and $\infty$ for $m_{wh}$. Define $$\delta_{wh}(x_P, y_P, x_I, y_I) = \begin{cases} P[x_P, y_P] - M_{wh}[x_I, y_I] & (C) \\ \quad \text{if } P[x_P, y_P] \ge M_{wh}[x_I, y_I]; \\ m_{wh}[x_I, y_I] - P[x_P, y_P] \\ \quad \text{if } m_{wh}[x_I, y_I] \ge P[x_P, y_P]; \\ 0 \quad \text{otherwise} \end{cases}$$

Similar to $\delta_N$, $\delta_{wh}$ measures the difference between the pattern pixel $(x_P, y_P)$ and range of values contained in the w by h rectangle of the image I at $(x_I, y_I)$. If w=h=1, then $\delta_{wh}(x_P, y_P, x_I, y_I) = \delta(x_P, y_P, x_I, y_I)$.

The block difference function for the sum of squared differences can be written as:

$$D_{wh}^{ssd}(t_x, t_y) = \sum_{x=0}^{P_w-1} \sum_{y=0}^{P_h-1} (\delta_{wh}(x, y, x+t_x, y+t_y))^2$$

The other block difference functions can similarly be modified to be defined in terms of $\delta_{wh}$. The affine versions of the block difference functions can also be extended in a similar manner.

Figure 3:
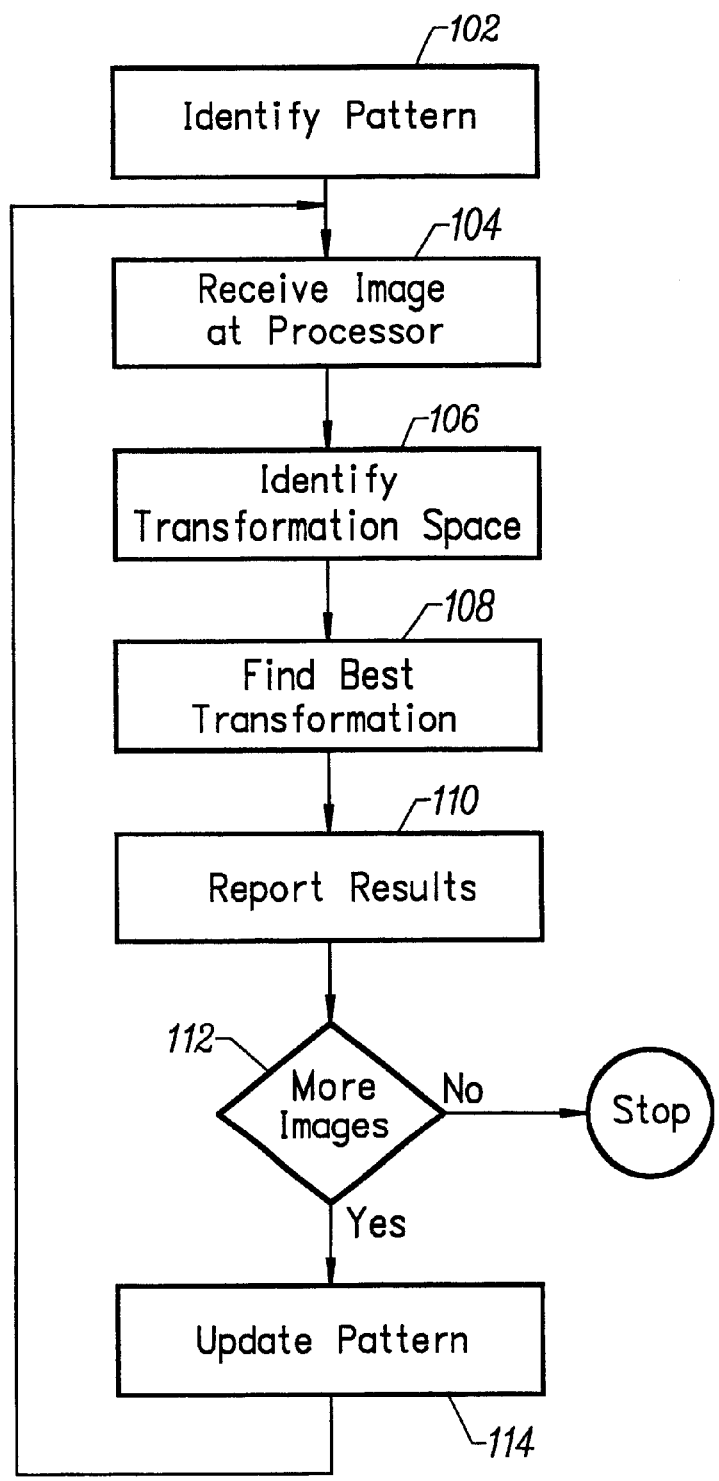
FIG. 3 is a flow chart illustrating the steps of finding a pattern in successive video images.

Using the above described computations, the search operates, as described in FIG. 3, by recursively searching transformation space in a multi-resolution manner on one or more successive images. In step 102, the pattern to be recognized is identified. There are several ways to identify the target pattern. For example, if the target pattern is part of a first image, the pattern can be identified using a pointing device, inputting coordinate boundaries or providing the pattern itself (e.g. in a file). Other means for identifying a pattern are also suitable. The exact method for identifying the pattern in step 102 is not necessarily important to the present invention. In step 104, a new image is received at the processor. For example, an image can be captured by camera 8 and received by processor unit 12 (see FIG. 1). Alternatively, an image can be received by email, file transfer, etc. The present invention can function using any one of various means for receiving images. In step 106, the transformation space is identified for the particular pattern and image. By definition, the transformation space exists on its own as a symbolic representation of the different transformations possible. In various alternatives, steps 102, 104 and 106 are optional.

In step 108, the system finds the best transformation for the pattern P in image I. If the image I is part of a sequence of images, then the transformation found would be the transformation from the position of P in the previous image to the position of P in the current image. In step 110, the system reports the results of step 108. Reporting the results can include showing the pattern found at the transformation identified in step 108 on a display or monitor, graphically identifying the coordinates of the pattern, graphically displaying the best transformation, returning from a function call and reporting the transformation or coordinates of the pattern, passing a pointer to the transformation or coordinates of a pattern, writing the transformation or the pattern coordinates into a file, passing any of the above information to another software process, transmitting any of the above information to other hardware, etc. In step 112, the system determines whether there are more images to be analyzed. If there are no more images, then the method of FIG. 3 is completed. If there are more images to be analyzed, the system updates the pattern in step 114. That is, when finding the pattern in the next image $I_{A+1}$, the system uses the pattern previously found in step 108 from image $I_A$ rather than the pattern from image $I_{A-1}$. In an alternative embodiment, step 114 can be skipped and the system can continue to use the original pattern identified in step 102. After step 114 is completed, the system loops back to step 104 and operates on the next image. It is possible that step 104 was performed prior to step 114. In fact, the system can continue to receive images (step 104) simultaneously while performing any of the other steps of FIG. 3. Thus, the order of the other steps shown in FIG. 3 can be rearranged as suitable depending on the particular application.

Figure 4:
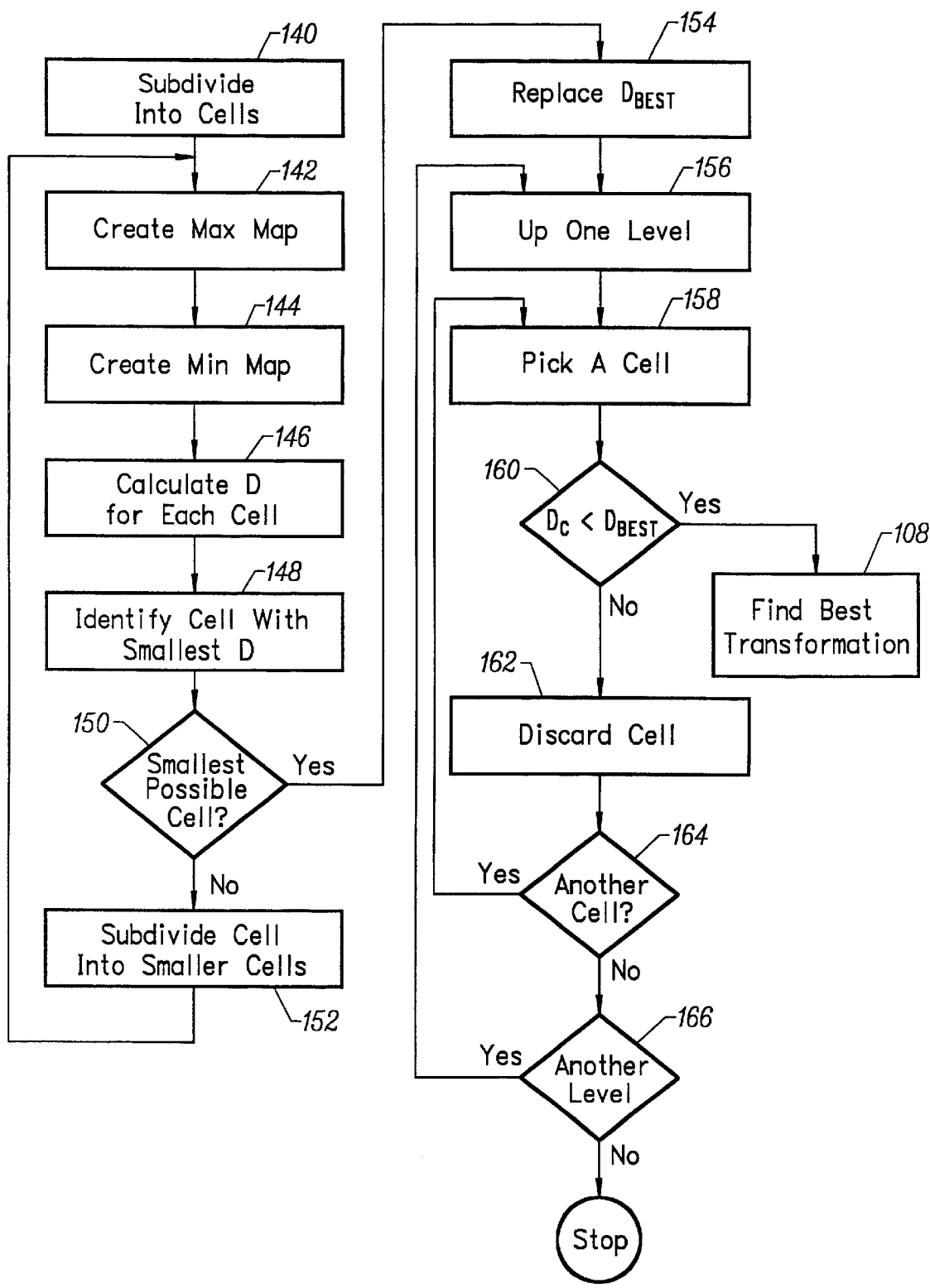
FIG. 4 is a flow chart describing the steps of finding a transformation of a pattern in an image.

The details of the step of finding the best transformation (step 108) are explained in the flow chart of FIG. 4. In step 140, the transformation space is subdivided into groups called cells. Each cell includes a number of possible transformations. For example, looking back at transformation T of FIG. 2, transformations G, H, Q, J, K, L, M, N and O can be grouped together as a cell. For translations, the cell would be two dimensional. For the affine transformation, the cell is six dimensional. The first time step 140 is performed on transformation space (e.g. the highest resolution level), the transformation space should be divided into a limited number of equally sized cells. For example, the transformation space can be divided into four equally sized cells having a width w and height h. In step 142, a maximum map is created using equation A above, based on w and h for a division into cells in step 140. In step 144, a minimum map is created using equation B, based on w and h from step 140. The maximum map is set up as an array such that each value in the max map represents a maximum value for the neighborhood of pixels in image I, where the neighborhood is the size w×h and the coordinate (x, y) in the max map corresponds to the corner of the neighborhood. The minimum map is set up in a similar fashion. The maps can be computed in log (wh) passes over image I.

Figure 5:
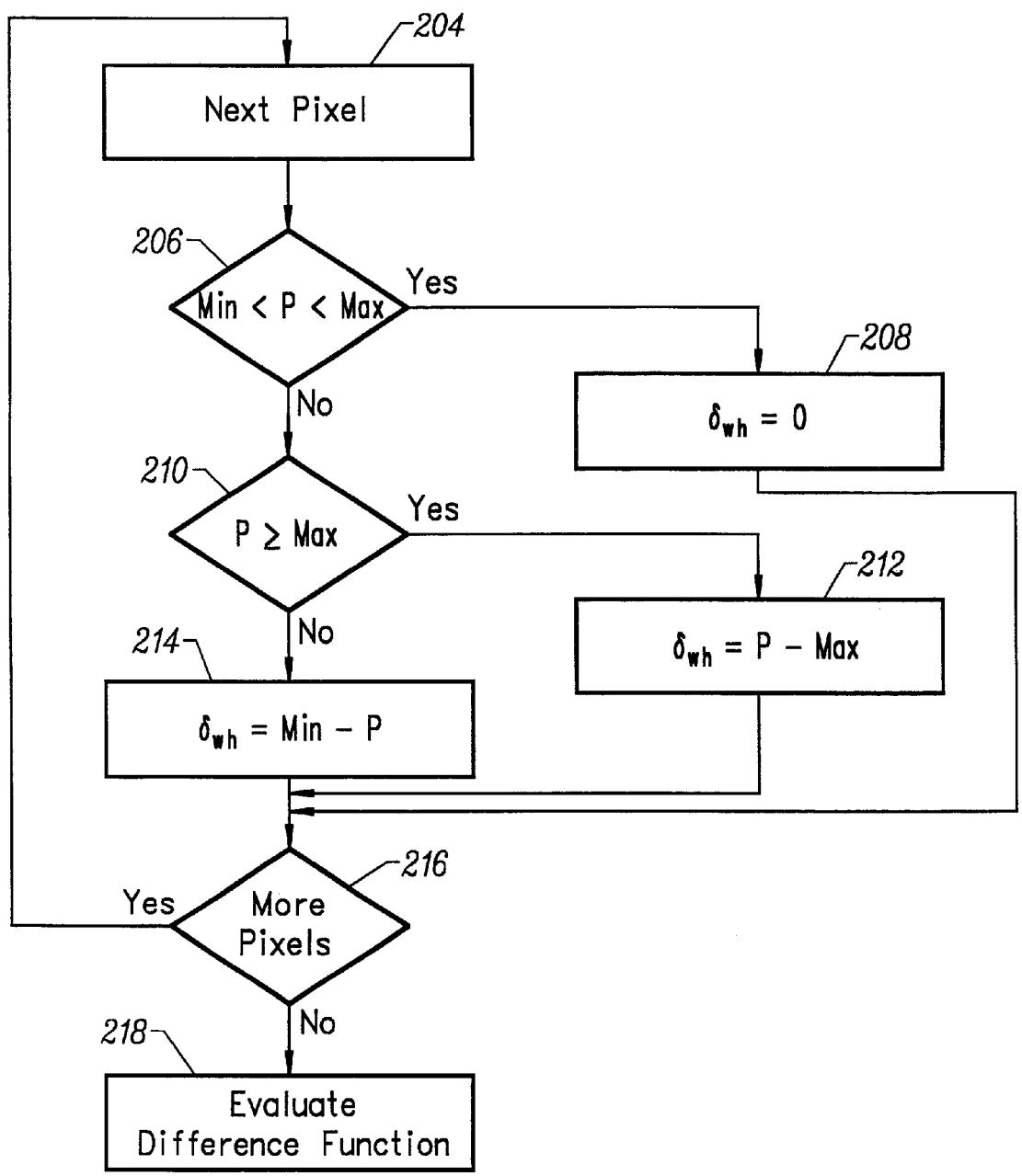
FIG. 5 is a flow chart explaining the steps calculating a difference value for a particular transformation.

In step 146, the system calculates a difference value $D_{wh}$ for each cell for the current resolution level. FIG. 5 is a flow chart describing the method of performing step 146 for each cell. Each cell has a reference transformation. The reference transformation is defined as the smallest transformation of all the transformations in a cell. For example, looking back at FIG. 2, if the cell consists of transformations G, H, Q, J, K, L, M, N and O, the reference transformation would be G where $G=(t_{Gx}, t_{Gy})$. If a cell only has one transformation, then that one transformation is the reference transformation.

In step 204, the next pixel is considered. If this is the first time step 204 is being performed, then the first pixel of the pattern is the pixel being operated on. To determine which pixel to operate on, the system starts with the pixel having the smallest x and y coordinates. For future iterations, increment x and/or y. In step 206, the system determines whether the pixel intensity value P of the pixel under consideration is within the minimum and maximum pixel values for the corresponding neighborhood. If so, then $\delta_{wh}=0$. If not, the system tests whether the pixel intensity is greater than or equal to the maximum value for the corresponding neighborhood (step 210). If so, $\delta_{wh}=P-\max$ (the maximum pixel intensity value for the neighborhood) (step 212). If the pixel intensity is not greater than the max, then the pixel value must be less than or equal to the minimum; therefore, $\delta_{wh}=\min-P$, where min is the minimum value for the neighborhood (step 214). After steps 208, 212 and 214, the system determines whether any more ixels in the pattern need to be examined. If so, the system loops back to step 204 and considers the next pixel. If all the pixels have been examined, then the system proceeds to step 218 to evaluate the appropriate block difference function using the values for $\delta_{wh}$ for each pixel. Steps 204 through 216 implement equation C.

Note that in the above discussion, when evaluating a cell the corresponding neighborhood for a pattern pixel is the neighborhood obtained by transforming the pattern pixel by the cell's reference transformation, and using that transformed location as the upper left corner of a box in the image whose width is w and whose height is h (where w and h are determined based on the cell's size). The box is the corresponding neighborhood. More precisely, the neighborhood is that neighborhood whose maximum value is $M_{wh}(t(p))$, where p is the pattern pixel and t is the cell's reference transformation.

After the system calculates a difference value for each cell in step 146, the system identifies the cell (or associated reference transformation) with the smallest difference value in step 148. Rather than test for the smallest difference value, the system can use another predefined set of criteria to determine one or more cells for further operation. In step 150, the system determines whether the cells at the current resolution level are the smallest possible cell size. In many cases, the smallest possible cell size will include one transformation. The criteria for defining the smallest possible cell size will differ by application. If the cells of the current resolution level are not the smallest possible size, then in step 152 the cell identified in step 148 is subdivided into smaller equally sized cells. Thus, new cells are created with a new w and a new h and are at a new resolution level. The system loops back to step 142 and performs step 142 through 150 for the new resolution level of cells.

If, in step 150 the system determines that it has reached the smallest possible cell, then the system proceeds to step 154 and replaces the value $D_{best}$, with the difference value D for the cell identified in the previous iteration of step 148. At the beginning of the method, the value of $D_{best}$ is initially set to infinity or some other very high number. In step 156, the system backtracks up one level of cells (e.g. to the previous level) and, in step 158, the system picks one of the cells from the new level under consideration. The system attempts to pick the best cell first, with "best" being based on a difference value. The system determines whether the cell picked in step 158 has a difference value less than $D_{best}$ (step 160). If it doesn't, that cell is discarded from further consideration (step 162) and the system determines whether there are any more cells at the current level (step 164). If there are more cells to consider, the system loops back to step 158. If there are no more cells to consider, then the system proceeds to step 166 and determines whether there is another level of cells above the current level of cells being considered. If there are no more levels of cells, the method of FIG. 4 is completed. If there is another higher level of cells, the system loops back to step 156 and the next higher level of cells is considered. For each cell identified in step 160 that has a difference value less than the current $D_{best}$ the system performs step 108 starting from that cell. That is, the system recursively calls the "find best transformation" step of FIG. 3 starting from that particular cell. Whenever the system reaches the smallest possible cell in step 150, it will replace $D_{best}$ with the difference value D of the cell if the difference value D of the cell is less than $D_{best}$. Thus, after backtracking through all levels of recursion, the final value for $D_{best}$ represents the difference value calculated for the best transformation. Thus, the transformation associated with $D_{best}$ is the best transformation reported in step 110 of FIG. 3.

The size of the grid of cells imposed on the transformation space (e.g. the cells) determines how fine the search is. For translations, the system considers only those translations with integral coordinates. For affine transformations, $a_{00}$ and $a_{10}$ can be discretised with a grid step of $1/P_w$; $a_{01}$ and $a_{11}$ can be discretised with a grid step of $1/P_h$; and $t_x$ and $t_y$ can be discretised with a grid step of 1. Thus, changing a transformation's parameters by one grid step in one dimension changes the location of each transformed pattern pixel by no more than one image pixel.

The reference transformation for each cell is easy to determine: for the translation-only search it is a translation of the cell having the smallest $t_x$ and $t_y$ parameters. For the affine search, it is similarly the transformation in the cell with the smallest $t_x$, $t_y$ and $a_{ij}$ parameters. Increasing any of these parameters can only increase the x and y coordinates of any transformed pattern pixel, as all the pattern pixel's original coordinates are non-negative.

Similarly, given the cell size for level i, $w_i$ and $h_i$ are easy to compute. In the translation case they are the size of the cell in the $t_x$ and $t_y$ dimensions, respectively. In the affine case, $w_i$ for a cell is the sum of the cell's edge lengths (counted in the appropriate grid steps) in the $a_{00}$, $a_{01}$ and $t_x$ dimensions; $h_i$ is the sum of the edge lengths in the $a_{10}$, $a_{11}$ and $t_y$ dimensions.

Computing the minimum and maximum maps for each level can include computing the minimum and maximum maps for lower levels. A lower level means a level with smaller cell sizes, but higher resolution. For example, completing a minimum and maximum map for a level having 8×8 cells can include creating the minimum and maximum maps for levels of 4×4 cells and 2×2 cells. Thus, steps 142 and 144 can be performed in earlier iterations of the method. More details of the above discussion can be found in "Efficient Guaranteed Search For Gray-Level Patterns," William J. Rucklidge, Proceedings of Computer Vision and Pattern Recognition 1997, p. 717–723, incorporated herein by reference.

The method discussed above ultimately attempts to find the best match for a pixel of the pattern to a pixel of the image. That is, at the bottom level of recursion a pattern pixel is compared to an image pixel. If the version of the pattern in the image has been changed (e.g. a change in size), a pixel to pixel comparison for the entire pattern may not be very accurate or efficient. In such a case, it is preferred to compare a pixel of the pattern to a neighborhood of pixels in the image, even at the lowest level of comparison. Thus, one embodiment of the present invention makes use of a modified pixel difference calculation $D_{Nwh}$, where even at the lowest level of cells, a pattern pixel is compared to a neighborhood of pixels. For example, consider the translation case for the sum of squared differences.

$$D_{Nwh}^{ssd}(t_x, t_y) = \sum_{x=0}^{P_w-1} \sum_{y=0}^{P_h-1} (\delta_{Nwh}(x, y, x+t_x, y+t_y))^2$$

and in affine case:

$$D_{Nwh}^{ssd}(A, t_x, t_y) = \sum_{x=0}^{P_w-1} \sum_{y=0}^{P_h-1} (d_{Nwh}(A, t_x, t_y, x, y))^2$$

$\delta_{Nwh}$ is determined by:

$$\delta_{Nwh}(x_P, y_P, x_I, y_I) = \begin{cases} P[x_P, y_P] - M_{Nwh}[x_I, y_I] \\ \quad \text{if } P[x_P, y_P] \geq M_{Nwh}[x_I, y_I]; \\ m_{Nwh}[x_I, y_I] - P[x_P, y_P] \\ \quad \text{if } m_{Nwh}[x_I, y_I] \geq P[x_P, y_P]; \\ 0 \quad \text{otherwise} \end{cases}$$

The maps for evaluating $\delta_{Nwh}$ are:

$$M_{Nwh}[x, y] = \max_{\substack{0 \leq x' < w \\ 0 \leq y' < h}} M_N[x+x', y+y']$$

$$m_{Nwh}[x, y] = \min_{\substack{0 \leq x' < w \\ 0 \leq y' < h}} m_N[x+x', y+y']$$

If the neighborhood N(x, y) consists of the point (x, y) and its eight neighbors (those directly or diagonally adjacent), then:

$$M_{Nwh}[x, y] = M_{(w+2)(h+2)}[x-1, y-1]$$

$$m_{Nwh}[x, y] = m_{(w+2)(h+2)}[x-1, y-1]$$

Thus, incorporating a 3×3 neighborhood N into the search can be done just by increasing $w_i$ and $h_i$ from each level by two, and offsetting the coordinates of the translations by one. For a 5×5 neighborhood, $w_i$ and $h_i$ are increased by three and the coordinates of the translation are offset by two. This modification (requiring almost no extra pre-computation) increases the robustness of the search. This observation applies whenever N(x, y) is a rectangular neighborhood.

In another embodiment, the method of the present invention can be improved for the case where the difference function is $D^{sad}$ (sum of absolute differences) and the search is over the space of translations. For purposes of the following discussion, it is assumed that the pattern's width and height ($P_w$ and $P_h$) are both 16. The technique described below works for other widths and heights, but is easier to explain the technology in terms of a fixed power of two.

Define $$P^s[x, y] = \sum_{x'=0}^{s-1} \sum_{y'=0}^{s-1} P[x+x', y+y']$$

$$I^s[x, y] = \sum_{x'=0}^{s-1} \sum_{y'=0}^{s-1} I[x+x', y+y']$$

$$M^s_{wh}[x, y] = \max_{\substack{0 \le x' < w \\ 0 \le y' < h}} I^s[x+x', y+y']$$

$$m^s_{wh}[x, y] = \min_{\substack{0 \le x' < w \\ 0 \le y' < h}} I^s[x+x', y+y']$$

$I^s$ is an image array such that $I^s[x, y]$ is equal to the sum of the pixel intensities for the s×s square of I (the image) whose upper left corner is $(x, y)$. $P^s$ is a pattern array such that $P^s[x, y]$ is equal to the sum of the pixel intensities for the s×s square of P (the pattern) whose upper left corner is $(x, y)$. $M^s_{wh}$ and $m^s_{wh}$, are like $M_{wh}$ and $m_{wh}$, but computed over $I^s$ rather than I.

The equation $$|I16[t_x,t_y]-P^{16}[0,0]| \le D^{sad}(t_x,t_y)$$

states that the absolute difference between the sums of the pixel intensities (or values) in the pattern and a region of the image is no greater than the sum of the absolute differences between the individual pixels. This inequality can be generalized to the more complete set of inequalities $$|I^{16}[t_x, t_y] - P^{16}[0, 0]| \le \sum_{x=0}^{1}\sum_{y=0}^{1} |I^8[t_x+8x, t_y+8y] - P^8[8x, 8y]|$$

$$\le \sum_{x=0}^{3}\sum_{y=0}^{3} |I^4[t_x+4x, t_y+4y] - P^4[4x, 4y]|$$

$$\le \sum_{x=0}^{7}\sum_{y=0}^{7} |I^2[t_x+2x, t_y+2y] - P^2[2x, 2y]|$$

$$\le \sum_{x=0}^{15}\sum_{y=0}^{15} |I[t_x+x, t_y+y] - P[x, y]|$$

$$= D^{sad}(t_x, t_y)$$

These inequalities show that the pattern can be compared with a portion of the image by considering the 16×16 sums of the pattern's pixels and the image's pixels, or four 8×8 sums of the pattern's pixels, or 4×4 or 2×2 sums. A bad match of any of these sum-based comparisons means that the pattern and that portion of the image do not match well. Thus, using these inequalities, a single translation $(t_x, t_y)$ can be proved to be no better than $D_{best}$ by examining two values ($I^{16}[t_x, t_y]$ and $P^{16}[0, 0]$), and comparing the result to $D_{best}$;

if the translation cannot be ruled out by that examination, examining eight values (four each from $I^8$ and $P^8$) and comparing the result to $D_{best}$;

if the translation cannot be ruled out by that examination, examining 32 values (16 each from $I^4$ and $P^4$) and comparing the result to $D_{best}$;

if the translation cannot be ruled out by that examination, examining 128 values (64 each from $I^2$ and $P^2$) and comparing the result to $D_{best}$; and if the translation cannot be ruled out by that examination, examining 512 values (256 each from I and P) and comparing the result to $D_{best}$.

If all goes well, most translations can be eliminated in the first few steps, so the total work done to consider every translation is greatly reduced.

Using these observations, the method of FIG. 4 can be modified as follows. Define $$\Delta(a, b, c) = \frac{1}{2}(|a-c| + |b-c| + (b-a))$$

When $a \le b$, this is equivalent to the definition $$\Delta(a, b, c) = \begin{cases} c-b & \text{if } c \ge b \\ a-c & \text{if } a \ge c \\ 0 & \text{otherwise} \end{cases}$$

Note that $$\delta_{wh}(t_x,t_y,x,y) = \Delta(m_{wh}[t_x+x, t_y+y], M_{wh}[t_x+x, t_y+y], P[x,y])$$

Define $$D^{sad}_{wh16}(t_x, t_y) = \Delta(m^{16}_{wh}[t_x, t_y], M^{16}_{wh}[t_x, t_y], P^{16}[0, 0])$$

This is the difference between the pattern's sum and the range of image sums seen in a w-by-h region.

It can be proved that if $$D_{wh16}{}^{sad}(t_x,t_y) > D_{best}$$

then for all translations $(t'_x, t'_y)$ such that $t_x \le t'_x < t_x+w$ and $t_y \le t'_y < t_y+h$, $$D^{sad}(t'_x,t'_y) > D_{best}$$

and it is safe to discard from consideration all translations in the cell having $t_x \le t'_x < t_x+w$ and $t_y \le t'_y < t_y+h$. This is proved as follows. By construction, for any $(t'_x, t'_y)$ in the cell, $$m_{wh}^{16}[t_x,t_y] \le I^{16}[t'_x,t'_y] \le M_{wh}^{16}[t_x,t_y]$$

and so $$D_{wh16}{}^{sad}(t_x, t_y) \le |I^{16}[t'_x,t'_y] - P^{16}[0,0]|$$

and $$D_{best} < D_{wh16}{}^{sad}(t_x,t_y) \le D^{sad}(t'_x,t'_y)$$

We can define $$D^{sad}_{wh8}(t_x, t_y) = \sum_{x=0}^{1}\sum_{y=0}^{1} \Delta(m^8_{wh}[t_x+8x, t_y+8y], M^8_{wh}[t_x+8x, t_y+8y], P^8[8x, 8y])$$

$$D^{sad}_{wh4}(t_x, t_y) = \sum_{x=0}^{3}\sum_{y=0}^{3} \Delta(m^4_{wh}[t_x+4x, t_y+4y], M^4_{wh}[t_x+4x, t_y+4y], P^4[4x, 4y])$$

Figure 6A:
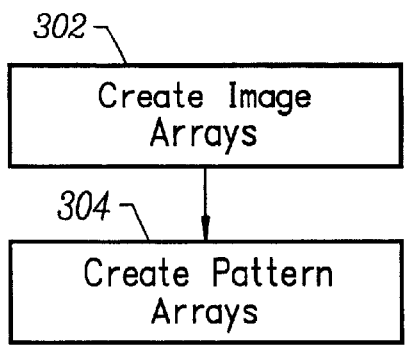
FIGS. 6A–6C are flow charts describing a second embodiment for discarding transformations during the search for the transformation of the pattern in the image.
Figure 6B:
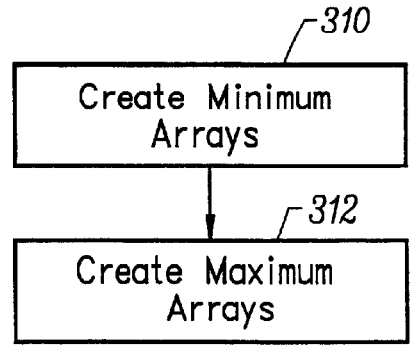
Figure 6C:
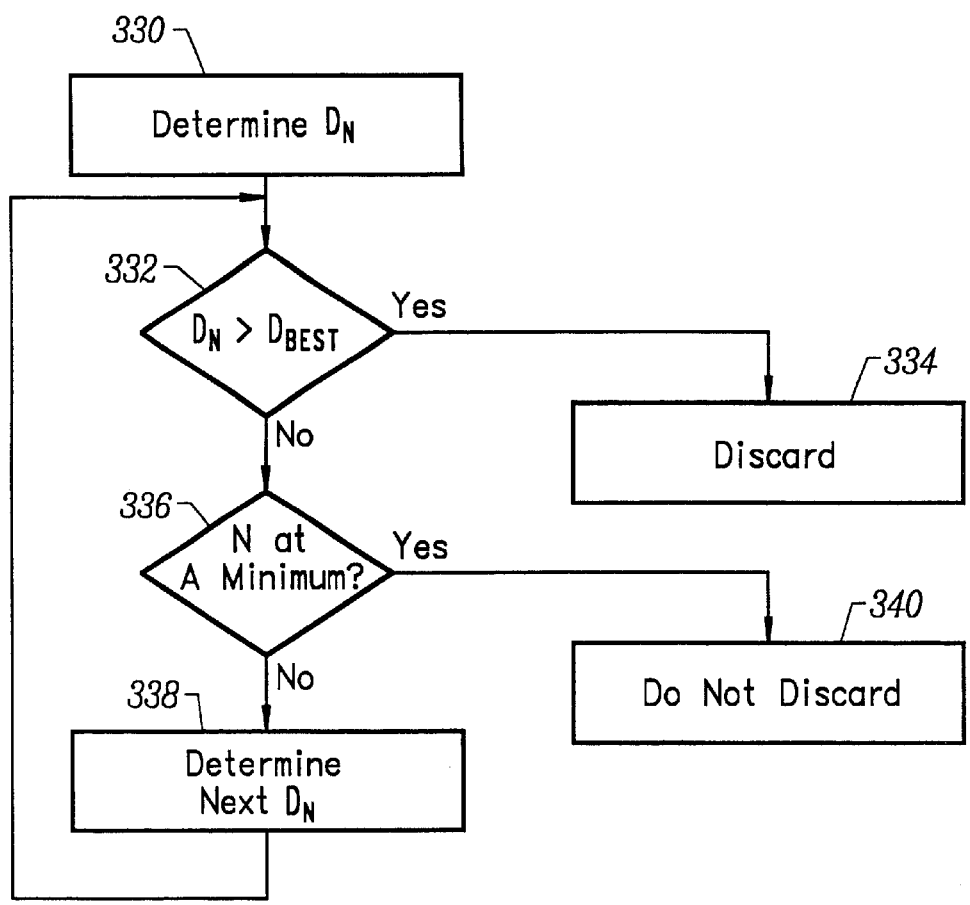

-continued $$D^{sad}_{wh2}(t_x, t_y) = \sum_{x=0}^{7}\sum_{y=0}^{7} \Delta(m^2_{wh}[t_x + 2x, t_y + 2y], M^2_{wh}[t_x + 2x, t_y + 2y], P^2[2x, 2y])$$

and show that, for a w-by-h cell of translations whose upper left corner is ($t_x$, $t_y$) and a translation ($t'_x$, $t'_y$) in that cell, if $D_{wh8}{}^{sad} > D_{best}$, then $D^{sad}(t'_x, t'_y) > D_{best}$
if $D_{wh4}{}^{sad} > D_{best}$, then $D^{sad}(t'_x, t'_y) > D_{best}$
   if $D_{wh2}{}^{sad} > D_{best}$, then $D^{sad}(t'_x, t_y) > D_{best}$ Thus, the method of FIG. 4 can be modified by the steps of FIGS. 6A–6C. In step 302 of FIG. 6A, the image arrays (e.g. $I^{16}$, $I^8$, $I^4$ and $I^2$) are precomputed. In step 304, the pattern arrays (e.g. $P^{16}$, $P^8$, $P^4$ and $P^2$) are precomputed. At every level in the search, where the cell size is w-by-h, the minimum arrays (e.g. $m_{wh}$, $m^2_{wh}$, $m^4_{wh}$, $m^8_{wh}$ and $m^{16}_{wh}$) are computed (step 310 of FIG. 6B) and the maximum arrays (e.g. $M^{16}_{wh}$, $M^8_{wh}$, $M^4_{wh}$, $M^2_{wh}$ and $M_{wh}$) are computed (step 312). The steps of FIGS. 6A and 6B are performed prior to the steps of FIG. 6C.

When a cell is being considered for discarding, the steps of FIG. 6C are performed. In step 330, the system computes $D_{whN}{}^{sad}(t_x,t_y)$, where N equals the width of the pattern (e.g. 16). If $D_{whN}{}^{sad}$ is greater than $D_{best}$ (step 332), then discard (e.g. remove from further consideration) the translations in the cell (step 334). If $D_{whN}{}^{sad}$ is not greater than $D_{best}$, then determine whether N is at a minimum value (e.g. 1) in step 336. If N is at the minimum value, the cell cannot be discarded (step 340). If N is not equal to the minimum value, then the system determines $D_{whN}{}^{sad}$ for the next lower value of N. It is easiest to keep N as a power of 2. Therefore, if the previous iteration of steps 332–336 included N=16, step 338 would compute $D_{wh8}{}^{sad}$. After performing step 338, the system loops back to step 332. Thus, $D_{wh8}{}^{sad}$, $D_{wh4}{}^{sad}$, $D_{wh2}{}^{sad}$ and $D_{wh}{}^{sad}$ would be successively compared to $D_{best}$ until the inequality of step 332 is satisfied (e.g. a difference value is greater than $D_{best}$).

Reconciling and modifying the steps of FIG. 4 with the steps of FIG. 6C includes calculating $D_{whN}{}^{sad}$ (step 330 of FIG. 6C) for the highest level of N in step 146 of FIG. 4. Steps 160 and 162 of FIG. 4 can be replaced by steps 332–340 of FIG. 6C. If steps 336 and 340 determine that the cell cannot be discarded, the method of FIG. 4 continues with step 108. If a cell is discarded in step 334, then the method of FIG. 4 continues with step 164.

All of the decisions in step 332 err on the side of caution, so if any of them says that discarding is safe, then it is safe. On the other hand, it might be safe even though none of the decisions say that it is. The decisions are ordered so that the cheapest comes first and if that one allows the cell to be discarded, then a considerable amount of work has been saved.

Although the embodiment of FIGS. 6A–C will, in most cases, run faster than the embodiment described in FIG. 4, the tradeoffs are that all of the various arrays that are computed take up memory and, for cells that are not pruned, this embodiment takes more time.

For example, let the pattern P be the 4×4 array shown in FIG. 7. That is, each box in FIG. 7 represents a pixel intensity. Let the image I be the 8×8 array shown in FIG. 8. Let w=h=2. FIG. 9A shows $P^2$ and FIG. 9B shows $P^4$. FIG. 10A shows $I^2$ and FIG. 10B shows $I^4$. FIG. 11A shows $m_{wh}$, FIG. 11B shows $m^2_{wh}$, and FIG. 11C shows $m^4_{wh}$. The maximum array $M_{wh}$ is depicted in FIG. 12A, $M^2_{wh}$ is depicted in FIG. 12B and $M^4_{wh}$ is depicted in FIG. 12C.

Now, consider the w×h (i.e., 2×2) cell of translations at $t_x=0$, $t_y=0$. Suppose that $D_{best}$ is 100. $D_{wh4}{}^{sad}$ is $$D^{sad}_{wh4}(0, 0) = \Delta(m^4_{wh}[0, 0], M^4_{wh}[0, 0], P^4[0, 0])$$
$$= \Delta(2040, 2040, 2040)$$
$$= 0$$

so based on the 4×4 sums, it is not possible to discard this cell.

$$D^{sad}_{wh2}(0, 0) = \sum_{x=0}^{1}\sum_{y=0}^{1} \Delta(m^2_{wh}[2x, 2y], M^2_{wh}[2x, 2y], P^2[2x, 2y])$$
$$= \Delta(510, 510, 1020) + \Delta(510, 510, 0) +$$
$$\Delta(510, 510, 1020) + \Delta(510, 510, 0)$$
$$= 510 + 510 + 510 + 510$$
$$= 2040$$

which is greater than $D_{best}$. Thus, based on the 2×2 sums, it is possible to discard this cell, and no more computations need to be done for the translations in the cell.

If the system had been using the method described in FIG. 4, the system would have computed $$D^{sad}_{wh}(0, 0) = \sum_{x=0}^{3}\sum_{y=0}^{3} \Delta(m_{wh}[x, y], M_{wh}[x, y], P[x, y])$$
$$= \Delta(0, 255, 255) + \Delta(0, 255, 0) +$$
$$\Delta(0, 255, 255) + \Delta(0, 255, 0) +$$
$$\Delta(0, 255, 255) + \Delta(0, 255, 0) +$$
$$\Delta(0, 255, 255) + \Delta(0, 255, 0) +$$
$$\Delta(0, 255, 255) + \Delta(0, 255, 0) +$$
$$\Delta(0, 255, 255) + \Delta(0, 255, 0) +$$
$$\Delta(0, 255, 255) + \Delta(0, 255, 0) +$$
$$\Delta(0, 255, 255) + \Delta(0, 255, 0)$$
$$= 0$$

Not only would more work have been performed, but it would not have been possible to discard the cell based on this work.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for determining a transformation of a gray level pattern in an image, comprising the steps of:
dividing a set of possible transformations into groups of transformations, each group having a reference transformation, each transformation of said set of possible transformations represents movement of said pattern;

determining whether a set of pixel intensities of said pattern are within minimum values and maximum values, said minimum values represent minimum pixel intensities for neighborhoods of pixels in said image and said maximum values represent maxim pixel intensities for neighborhoods of pixels in said image, said step of determining being performed for each reference transformation;

applying a difference function based on said step of determining, said step of applying being performed for each reference transformation; and identifying a particular transformation which meets a predefined criteria with respect to said difference function.

2. A method according to claim 1, further including the step of:

discarding transformations in groups of transformations having reference transformations with a difference function worse than a previously determined best known difference value.

3. A method according to claim 1, further including the steps of:

continuously dividing a transformation space into smaller groups until a minimum group size is considered, each of said groups belonging to one level of a set of levels, said step of dividing a transformation space includes choosing at least one group for dividing in each of at least a subset of said levels, said step of choosing includes said steps of determining whether a set of pixel intensities, applying a difference function and identifying a transformation; and backtracking through said levels including removing groups from consideration having a difference value worse than a best known difference value and performing said steps of continuously dividing on said groups having a difference value better than said best known difference value, subsequent to finally completing said step of backtracking said best known difference value corresponds to said transformation of said gray level pattern in said image.

4. A method according to claim 3, wherein:
said groups are two dimensional.

5. A method according to claim 3, wherein:
said groups are six dimensional.

6. A method according to claim 3, further including the steps of:
receiving said pattern; and
receiving said image.

7. A method according to claim 3, further including the step of: reporting said transformation of said gray level pattern in said image.

8. A method according to claim 3, wherein:
groups for a first level have a first groups size; and
neighborhoods for said first level have a second size, said second size being determined by said first size.

9. A method according to claim 3, wherein said step of determining whether a set of pixel intensities of said pattern are within minimum values and maximum values includes the steps of:

comparing a pixel intensity of said pattern to a first data value at a transformed location in a map of minimum values; and comparing said pixel intensity of said pattern to a second data value at a transformed location in a map of maximum values.

10. A method according to claim 9, wherein said step of determining whether a set of pixel intensities of said pattern are within minimum values and maximum values further includes the steps of:

setting a pixel-region difference as zero if said pixel intensity is less than said second data value and greater than said first data value;

setting said pixel-region difference as a difference between said first data value and said pixel intensity if said pixel intensity is less than said first data value; and setting said pixel-region difference as a difference between said pixel intensity and said second data value if said pixel intensity is greater than said second data value.

11. A method according to claim 10, wherein:
said step of applying a difference function applies said difference function to said pixel-region difference.

12. A method for determining a transformation of a gray level pattern in an image, comprising the steps of continuously dividing a set of possible transformations into smaller groups until a minimum group size is considered, each of said groups belonging to one level of a set of levels, each transformation of said set of possible transformations represents movement of said pattern, said step of dividing includes choosing at least one group for dividing in each of at least a subset of said levels, said step of choosing includes determining a difference value for a subset of groups based on determining whether a set of pixel intensities of said pattern are within minimum values and maximum values, said minimum values represent minimum pixel intensities for neighborhoods of pixels in said image and said maximum values represent maximum pixel intensities for neighborhoods of pixels in said image; and backtracking through said levels including removing groups from consideration having a difference value worse than a best known difference value and performing said steps of continuously dividing on said groups having a difference value better than said best known difference value, subsequent to finally completing said step of backtracking said best known difference value corresponds to said transformation of said gray level pattern in said image.

13. A method according to claim 12, wherein:
said step of choosing includes identifying a first set of one or more reference transformations for said pattern;

said step of determining a difference value uses a difference function;

said step of determining a difference value is performed on at least a subset of said reference transformations; and said step of choosing further includes identifying at least one reference transformation which meets a predefined criteria with respect to said difference function.

14. A method according to claim 12, further including the steps of:
receiving said pattern;
receiving said image; and
reporting said transformation of said gray level pattern in said image.

15. A method according to claim 12, wherein:
said step of determining whether a set of pixel intensities of said pattern are within minimum values and maximum values includes the steps of:

comparing a pixel intensity of said pattern to a first data value at a transformed location in a map of minimum values, comparing said pixel intensity of said pattern to a second data value at a transformed location in a map of maximum values, setting a pixel-region difference as zero if said pixel intensity is less than said second data value and greater than said first data value, setting said pixel-region difference as a difference between said first data value and said pixel intensity if said pixel intensity is less than said first data value, and setting said pixel-region difference as a difference between said pixel intensity and said second data value if said pixel intensity is greater than said second data value.

16. A method for finding a gray level pattern in an image, comprising the steps of:

identifying said pattern in a first image, said pattern being at a first position in said first image;

receiving a second image; and determining a transformation of said pattern in said second image based on said first position, said transformation represents movement of said pattern from said first position, said step of determining a transformation includes:

identifying a first set of one or more possible reference transformations for said pattern, determining whether a set of pixel intensities of said pattern are within minimum values and maximum values, said minimum values represent minimum pixel intensities for neighborhoods of pixels in said second image and said maximum values represent maximum pixel intensities for neighborhoods of pixels in said second image, said step of determining being performed for each reference transformation in said first set, applying a difference function based on said step of determining, said step of applying being performed for each reference transformation in said first set, and identifying a particular reference transformation which meets a predefined criteria with respect to said difference function.

17. A method according to claim 16, wherein:

said pattern is at a second position in said second image;

receiving a third image; and determining a transformation of said pattern in said third image based on said second position.

18. A method according to claim 16, further including the step of:

reporting a position of said pattern in said second image based on said transformation of said pattern in said second image.

19. A method according to claim 16, wherein:

said step of determining whether a set of pixel intensities are within minimum values and maximum values includes the steps of:

comparing a pixel intensity of said pattern to a first data value at a transformed location in a map of minimum values, comparing said pixel intensity of said pattern to a second data value at a transformed location in a map of maximum values, setting a pixel-region difference as zero if said pixel intensity is less than said second data value and greater than said first data value, setting said pixel-region difference as a difference between said first data value and said pixel intensity if said pixel intensity is less than said first data value, and setting said pixel-region difference as a difference between said pixel intensity and said second data value if said pixel intensity is greater than said second data value.

20. A method according to claim 19, wherein:

said step of applying a difference function, applies said difference function to said pixel-region difference.

21. A processor readable storage medium having processor readable code embodied on said processor readable storage medium, said processor readable code for programming a processor to perform a method for determining a transformation of a gray level pattern in an image, the method comprising the steps of:

continuously dividing a set of possible transformations into smaller groups until a minimum group size is considered, each of said groups belonging to one level of a set of levels, each transformation of said set of possible transformations represents movement of said pattern, said step of dividing includes choosing at least one group for dividing in each of at least a subset of said levels, said step of choosing includes determining a difference value for a subset of groups based on determining whether a set of pixel intensities of said pattern are within minimum values and maximum values, said minimum values represent minimum pixel intensities for neighborhoods of pixels in said image and said maximum values represent maximum pixel intensities for neighborhoods of pixels in said image; and backtracking through said levels including removing groups from consideration having a difference value worse than a best known difference value and performing said step of continuously dividing on said groups having a difference value better than said best known difference value, subsequent to finally completing said step of backtracking said best known difference value corresponds to said transformation of said gray level pattern in said image.

22. A processor readable storage medium according to claim 21, wherein:

said step of choosing includes the step of identifying a first set of one or more reference transformations for said pattern;

said step of determining a difference value uses a difference function;

said step of determining a difference value is performed on at least a subset of said reference transformations; and said step of choosing further includes identifying at least one reference transformation which meets a predefined criteria with respect to said difference function.

23. A processor readable storage medium according to claim 21, wherein said method further including the steps of:

receiving said pattern;

receiving said image; and reporting said transformation of said gray level pattern in said image.

24. A processor readable storage medium according to claim 21, wherein said step of determining whether a set of pixel intensities of said pattern are within minimum values and maximum values includes the steps of:

comparing a pixel intensity of said pattern to a first data value at a transformed location in a map of minimum values; and comparing said pixel intensity of said pattern to a second data value at a transformed location in a map of maximum values.

25. A processor readable storage medium according to claim 24, wherein said step of determining whether a set of pixel intensities of said pattern are within minimum values and maximum values includes the steps of:

setting a pixel-region difference as zero if said pixel intensity is less than said second data value and greater than said first data value;

setting said pixel-region difference as a difference between said first data value and said pixel intensity if said pixel intensity is less than said first data value; and setting said pixel-region difference as a difference between said pixel intensity and said second data value if said pixel intensity is greater than said second data value.

26. An apparatus for determining a transformation of a gray level pattern in an image, comprising:

an input device;

a display for showing said image;

a processing unit in communication with said input device and said display; and a processor readable storage device in communication with said processing unit, said processor readable storage device storing processor readable code, said processor readable code for programming said processing unit to perform a method comprising the steps of continuously dividing a set of possible transformations into smaller groups until a minimum group size is considered, each of said groups belonging to one level of a set of levels, said step of dividing includes choosing at least one group for dividing in each of at least a subset of said levels, each transformation of said set of possible transformations represents movement of said pattern, said step of choosing includes determining a difference value for a subset of groups based on determining whether a set of pixel intensities of said pattern are within minimum values and maximum values, said minimum values represent minimum pixel intensities for neighborhoods of pixels in said image and said maximum values represent maximum pixel intensities for neighborhoods of pixels in said image; and backtracking through said levels including removing groups from consideration having a difference value worse than a best known difference value and performing said step of continuously dividing on said groups having a difference value better than said best known difference value, subsequent to finally completing said step of backtracking said best known difference value corresponds to said transformation of said gray level pattern.

27. An apparatus according to claim 26, wherein:

said step of choosing includes the step of identifying a first set of one or more reference transformations for said pattern;

said step of determining a difference value uses a difference function;

said step of determining a difference value is performed on at least a subset of said reference transformations; and said step of choosing further includes identifying at least one reference transformation which meets a predefined criteria with respect to said difference function.

28. An apparatus according to claim 26, wherein:

said step of determining whether a set of pixel intensities of said pattern are within minimum values and maximum values includes the steps of:

comparing a pixel intensity of said pattern to a first data value at a transformed location in a map of minimum values, comparing said pixel intensity of said pattern to a second data value at a transformed location in a map of maximum values, setting a pixel-region difference as zero if said pixel intensity is less than or equal to said second data value and greater than or equal to said first data value, setting said pixel-region difference as a difference between said first data value and said pixel intensity if said pixel intensity is less than said first data value, and setting said pixel-region difference as a difference between said pixel intensity and said second data value if said pixel intensity is greater than said second data value.

29. An apparatus according to claim 26, wherein:

said input device is a video camera capable of capturing video images; and said method is capable of finding transformations of said pattern in successive video images captured by said video camera.

* * * * *